(12) United States Patent
Sanger et al.

(10) Patent No.: US 7,327,380 B2
(45) Date of Patent: Feb. 5, 2008

(54) APPARATUS FOR PRINTING A MULTIBIT IMAGE

(75) Inventors: Kurt M. Sanger, Rochester, NY (US); Thomas A. Mackin, Hamlin, NY (US); Seung Ho Baek, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 961 days.

(21) Appl. No.: 10/355,932

(22) Filed: Jan. 31, 2003

(65) Prior Publication Data

US 2004/0150710 A1 Aug. 5, 2004

(51) Int. Cl.
*B41J 2/47* (2006.01)
*G06F 15/00* (2006.01)

(52) U.S. Cl. .............. 347/251; 347/232; 347/256; 347/252; 358/1.9; 358/2.1; 358/3.1

(58) Field of Classification Search ........ 358/3.01, 358/3.23, 3.03, 3.1, 1.9, 2.1, 3.09, 3.02; 352/227; 382/302; 347/232, 251, 256, 252
See application file for complete search history.

(56) References Cited

U.S. PATENT DOCUMENTS

| | | | |
|---|---|---|---|
| 4,122,496 A | 10/1978 | Childress et al. | |
| 5,140,349 A | 8/1992 | Abe et al. | |
| 5,250,934 A | 10/1993 | Denber et al. | |
| 5,255,085 A | 10/1993 | Spence | |
| 5,293,539 A | 3/1994 | Spence | |
| 5,369,497 A * | 11/1994 | Allen et al. | 358/3.12 |
| 5,553,171 A * | 9/1996 | Lin et al. | 382/299 |
| 5,966,394 A | 10/1999 | Spurr et al. | |
| 6,121,993 A | 9/2000 | Maekawara et al. | |
| 6,448,996 B2 * | 9/2002 | Suganuma | 347/248 |
| 6,694,446 B1 * | 2/2004 | Charrat | 713/502 |

FOREIGN PATENT DOCUMENTS

EP  1 014 304 A1  6/2000

OTHER PUBLICATIONS

Graphic technology—Graphic arts reflection densitometry measurements—Terminology, equations, image elements and procedures, 1993, p. 7.

* cited by examiner

*Primary Examiner*—King Y. Poon
*Assistant Examiner*—S. Kau
(74) *Attorney, Agent, or Firm*—Nelson Adrian Blish

(57) ABSTRACT

The invention relates to an apparatus for printing a multibit per pixel image (10) from a halftone binary digital bitmap having pixels having a multibit per pixel image memory for receiving the multibit per pixel image; a lookup table (16) external to the memory disposed in a programmable gate array (18) for converting the multibit per pixel image to a base duty cycle (20) wherein the base duty cycle is disposed in the programmable gate array and is adapted for creating a modulated drive signal (22) from the base duty cycle to modulate an exposure (24) for each pixel in the multibit per pixel image; and a printer (28) adapted for using the modulated exposure to print an image, having a dpi greater than 1400, further comprising a drum (32) capable of spinning, and an encoder (34) disposed on the drum for providing a home signal (36) and a pixel rate (38).

5 Claims, 3 Drawing Sheets

APPARATUS FOR PRINTING A MULTIBIT IMAGE

CROSS REFERENCE TO RELATED APPLICATIONS

Reference is made to commonly-assigned copending U.S. patent application Ser. No. 10/356,006, filed Jan. 31, 2003, entitled METHOD FOR PRINTING A COLOR PROOF USING A SPATIAL FILTER, by Kurt M. Sanger; U.S. patent application Ser. No. 10/355,600, now U.S. Pat. No. 6,893,105 filed Jan. 31, 2003, entitled A METHOD FOR PRINTING AN IMAGE FROM A HALFTONE BINARY BITMAP USING MULTIPLE EXPOSURES, by Sanger et al.; U.S. patent application Ser. No. 10/355,372, filed Jan. 31, 2003, entitled METHOD OF ADJUSTING COLOR IN A COLOR PROOF, by Sanger et al.; and U.S. patent application Ser. No. 10/355,849, now U.S. Pat. No. 7,253,924 filed Jan. 31, 2003, entitled METHOD OF IMAGING MULTIPLE BINARY BITMAPS IN A SINGLE PASS, by Sanger et al., the disclosures of which are incorporated herein.

FIELD OF THE INVENTION

This invention generally relates to an apparatus for printing high resolution bitmap images and more particularly, for printing an image from a halftone digital bitmap.

BACKGROUND OF THE INVENTION

A typical digital halftone color proofer uses four colors. Each of the colors, cyan, magenta, yellow, and black (CMYK) are imaged at constant exposure and 1800 dpi. The donors consisted of a visible dye and an infrared dye, which absorbed laser energy and sublimate, causing an amount of visible dye to transfer to an intermediate receiver sheet. The amount of dye transferred is proportional to the amount of laser energy deposited onto the donor. The resultant density level of a solid image resulting on the print is determined by the exposure delivered to each donor. Laser power levels are used at two drum speeds to adjust the exposure for each colorant.

The digital color halftone proofer may have a writing resolution of 2540 dpi or 2400 dpi. Color proofers may use both laser power and drum speed to adjust the exposure for each colorant. A drum speed increment of 25 RPM allows running close to the maximum laser power most of the time thereby increasing print throughput. Typically, color proofers image one bitmap at one exposure per pass. The high writing resolution and the small spot size, approximately 25 um, are used to simulate center weighted halftone dots and text that are normally imaged on a printing press.

Previously, the need to create a multilevel printer with resolutions greater than 1200 dpi did not exist since writing at 1200 dpi produces good looking binary text. The human eye can distinguish image features up to approximately 100 cycles per inch. The unaided eye may not distinguish frequencies greater than 100 cycles per inch, (4 cycles per mm). The maximum print density on paper is approximately 2.0 Status T density. The eye may see a 0.01 density change as a just noticeable difference. A printer with a dynamic range of 200 levels, a maximum Status T density of 2.0, and a writing resolution of 100 cycles per inch, produces a level of quality such that one level change on one pixel produces a visible difference.

A center weighted halftone print produces tone scale by changing the size of the halftone dot. Halftone screens have a screen ruling or halftone dot spatial frequency, and a screen angle. Higher spatial frequencies are used to eliminate the visibility of the halftone. A 150 dpi halftone screen is above the 100 cycles per inch human eye threshold and is not visible to the naked eye.

For a Status T solid density of 2.0, paper Status T density of 0.10, and a 50% dot; a 0.01 density change is a 1.17% change in dot area requiring a minimum writing resolution of 1387 dpi to simulate a halftone dot image. At the 90% dot level an 0.01 density change is a 0.26% change in dot area requiring almost 3000 dpi writing resolution. Normally for imaging halftone screens at 1800 to 2540 dpi writing resolution 0.01 density changes can be achieved without using multiple exposure levels. Prior to the present invention, no one has produced a printer capable of writing multiple exposures at these resolutions because such a printer would exceed the capability of the unaided human eye, making it difficult for an observer to differentiate its benefits. This would make the printer more expensive and less competitive against lower cost products.

Color proofers create halftone bitmaps of cyan, magenta, yellow, and black color planes using a raster image processor (RIP). Customer artwork is composed into pages using software such as Quark Express™ or Adobe InDesign™. These pages may consist of color images, black and white images, artwork, linework, and text. Images may be continuous tone, multilevel, or binary. The pages may also contain PDF or PostScript codes. The RIP processes the input pages and creates halftone bitmap files for each color plane at the writing resolution of the printer. The RIP converts multilevel input, such as the pixels in a continues tone image, into halftone dots of the appropriate size.

To calibrate the halftone dot image, a dot gain correction curve is added to the continuous tone image prior to raster image processing the continuous tone image into a halftone bitmap. This imposes the dot gain correction onto the rendered halftone dot so that the output print measures the correct density and visibly matches the printed sheet. The calibration curve can be created by known methods, such as those described in U.S. Pat. Nos. 5,255,085 and 5,293,539. Percent dot area is calculated using the Murray-Davies equation from measured densities. The Murray-Davies equation is defined in ANSI/CGATS, 4-1993, 1993, p. 7. This calibration method adjusts the image tone scale or dot gain by changing the size of the simulated halftone dot.

Another method of calibration is to filter the bitmap image to change the size of the simulated halftone dot. U.S. Pat. No. 5,250,934 discloses a method of shifting and adding a bitmap image with itself to thin the image displayed. U.S. Pat. No. 5,250,934 discloses a method of setting a bit to an intermediate level if it is diagonally between two active bits using shifting, logical AND, and a logical OR operation.

In correcting for the tone scale of the image using the previous techniques the size of the written halftone dot is changed in the bitmap image to generate a print with the correct measured density. A method of correcting the tone-scale or dot-gain of the image without changing the size of the halftone dot would generate a proof that more closely matches the press sheet. Instead of changing the size of the halftone dot, a bitmap consisting of the edges of the halftone dots for each bitmap plane is created. The original bitmap is printed at a first exposure to obtain the nominal solid density required. The additional bitmap can be imaged at a second exposure to create additional density for each halftone dot and change the dot gain in the proof without changing the size of the written halftone dots. This method requires making an additional exposure pass which increases the time required to create the proof.

Some printers also have a feature called recipe color which allows the customer to image a bitmap with more than one colorant and exposure. This allows the customer to mix his own color and simulate printing with a unique spot color ink. For instance, the customer may desire to print using a custom red ink which is simulated by imaging a magenta donor at a first exposure to achieve 1.0 magenta density followed by imaging yellow donor at a second exposure to achieve 0.50 yellow density. By imaging the 1.0 magenta and 0.50 yellow passes with the same bitmap in registration on the proof a solid red color is created. This technique also requires additional exposure passes to image each special or spot color desired in the job. Recipe colors may be created using combinations of any of the donors available in the printer. The additional exposure passes increase the printing time required resulting in lower print throughput.

A problem can result from incorrect color of the overprints between cyan, magenta, yellow, and black. When imaging the primary color planes the exposure is set to achieve the density of the solid primaries. This results in slight color errors when the primaries overlap each other when compared to the inks used in the printing process that must be matched. For example, the overprint of cyan and magenta yields the color blue. However the blue from the printer may not exactly match the blue achieved using inks on press. A blue bitmap can be created by the logical AND of each bit in the cyan bitmap with each bit in the magenta bitmap. Then the blue bitmap is imaged as a recipe color. However this technique also requires additional exposure passes, which decreases the throughput of the printer.

Current printers have a set of laser diode controllers for each laser channel as described in U.S. Pat. No. 5,966,394. The drum speed and translation speed have to remain constant within each imaging pass. To image multiple levels within a pass the laser power needs to be modified. A need has existed to keep the existing laser diode controller for all of its benefits described by U.S. Pat. No. 5,966,394, yet replace the data path driving the laser diodes and upgrade existing equipment.

SUMMARY OF THE INVENTION

The invention relates to an apparatus for printing a multibit per pixel image from a halftone binary digital bitmap having pixels comprising a multibit per pixel image. The image is received by memory. A lookup table within a programmable gate array, external to the memory disposed, converts the multibit per pixel image to a base duty cycle. The base duty cycle is disposed in the programmable gate array and is adapted for creating a modulated drive signal from the base duty cycle to modulate an exposure for each pixel in the multibit per pixel image. A printer, adapted for using the modulated exposure to print an image, having a dpi greater than 1400, further comprises a drum capable of spinning, and an encoder disposed on the drum for providing a home signal and a pixel rate.

DETAILED DESCRIPTION OF THE INVENTION

The invention relates to an apparatus for printing an image from a halftone binary digital bitmap having pixels comprising: a multibit per pixel image, memory for receiving the multibit per pixel image; a lookup table external to the memory disposed in a programmable gate array for converting the multibit per pixel image to a base duty cycle wherein the base duty cycle is disposed in the programmable gate array and is adapted for creating a modulated drive signal from the base duty cycle to modulate an exposure for each pixel in the multibit per pixel image; and a printer adapted for using the modulated exposure to print an image, having a dpi greater than 1400, further comprising a drum capable of spinning, and an encoder disposed on the drum for providing a home signal and a pixel rate. This apparatus can be used to create an image on media having a dpi more preferably between 1800 and 4000 dpi. A preferred media is Kodak Approval Donor media or Imation Matchprint media.

Figure 1:
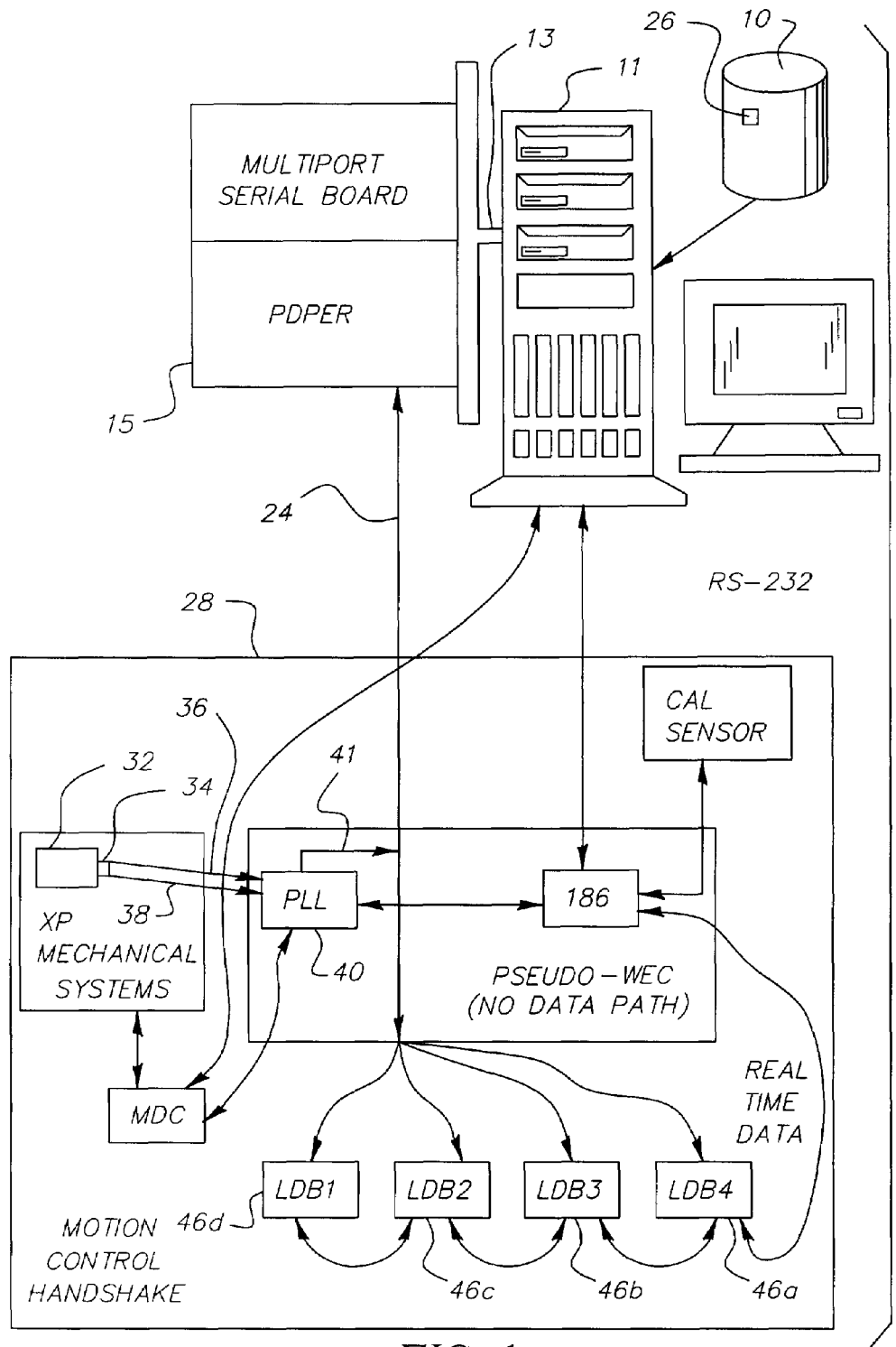
FIG. 1 shows an overview of the apparatus of the invention.

Referring to FIG. 1, which is the unique apparatus of the invention for printing an image from a halftone binary digital bitmap having pixels. The apparatus of FIG. 1 shows that a multibit per pixel image 10 can be loaded into memory for receiving the multibit per pixel image such as through a PCI bus 13. Alternatively, the multibit per pixel image 10 can be on a disc and can be loaded and stored on a computer 11.

Figure 2:
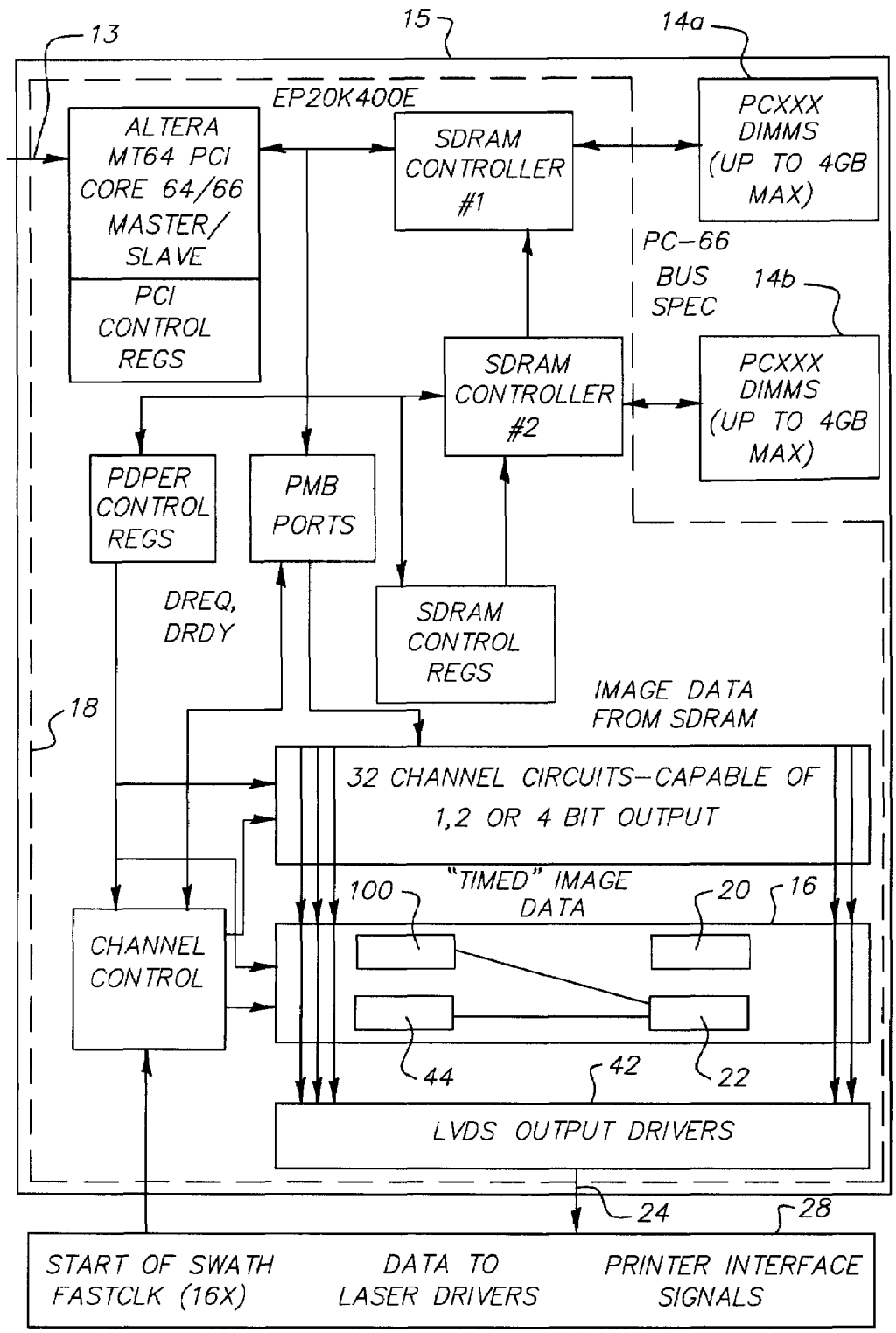
FIG. 2 is a detail of the data path used in the apparatus of FIG. 1.

FIG. 2 shows that two sets of memory can be used 14*a* and 14*b* so that images are loaded into one of the memory and print from the other.

A preferred board to support the memory would be a preferred printer data path 15. A lookup table 16 shown in FIG. 2 is external to the memory and disposed in a programmable gate array 18.

The programmable gate array 18 is for converting the multibit per pixel image 10 to a base duty cycle 20. The base duty cycle 20 is disposed in the programmable gate array and is adapted for creating a modulated drive signal 22 from the base duty cycle to which is a modulated exposure 24 for each pixel 26 in the multibit per pixel image. The base duty cycle is loaded into the lookup table 16 for each of the pixel values, preferably sixteen levels for a four bit pixel. The base duty cycle then defines the "on" time of the pixel from 0 to 100% in increments of a high frequency pixel clock 41 which is described later. This invention permits a user to change the base duty cycle used for each pixel value can be changed independently of the others depending on how the printer is to be used. This ability to independently change these values makes printing of the exposures more controllable than systems designed previously.

A printer 28 adapted for using the modulated exposure 24 for each pixel to print an image having a dpi greater than 1400, further comprising a drum 32 capable of spinning, and an encoder 34 disposed on the drum for providing a home signal 36 and a pixel rate 38. The exposure is modulated by turning off a portion of the pixels for a period of time or using pulse width modulation for a portion of the pixel.

In a preferred embodiment can include a phase lock loop 40 in communication with the programmable gate array 18 to modify the pixel rate 38 to a multiple of the pixel rate forming a high frequency pixel clock 41. In the most preferred embodiment, the high frequency clock is sixteen times the pixel rate 38.

In still another embodiment, the apparatus can include a trailing edge extension circuit 42 programmed into the programmable gate array 18 for extending the end of the modulated exposure 24 by a trailing edge extension (TEE) count 44. A usable programmable gate array could be an Altera gate array PN EP20K600EBC652-1X, available from Altera of San Jose, Calif.

The TEE count is preferably determined from the lookup table 16. In this embodiment, the TEE count and the base duty cycle is loaded into the lookup table at a distinct level for each of the pixel values. The trailing edge extension circuit 42 extends the trailing edge of the pulse width modulated pixel by an amount determined by the TEE count number times the period of a second high frequency clock 100, as shown in FIG. 2. In the preferred embodiment, the second high frequency clock is greater than 100 megahertz.

The printer can at least one laser driver board 46a. FIG. 1 shows four laser driver boards, 46a, 46b, 46c and 46d such as those manufactured by Eastman Kodak Company.

Figure 3:
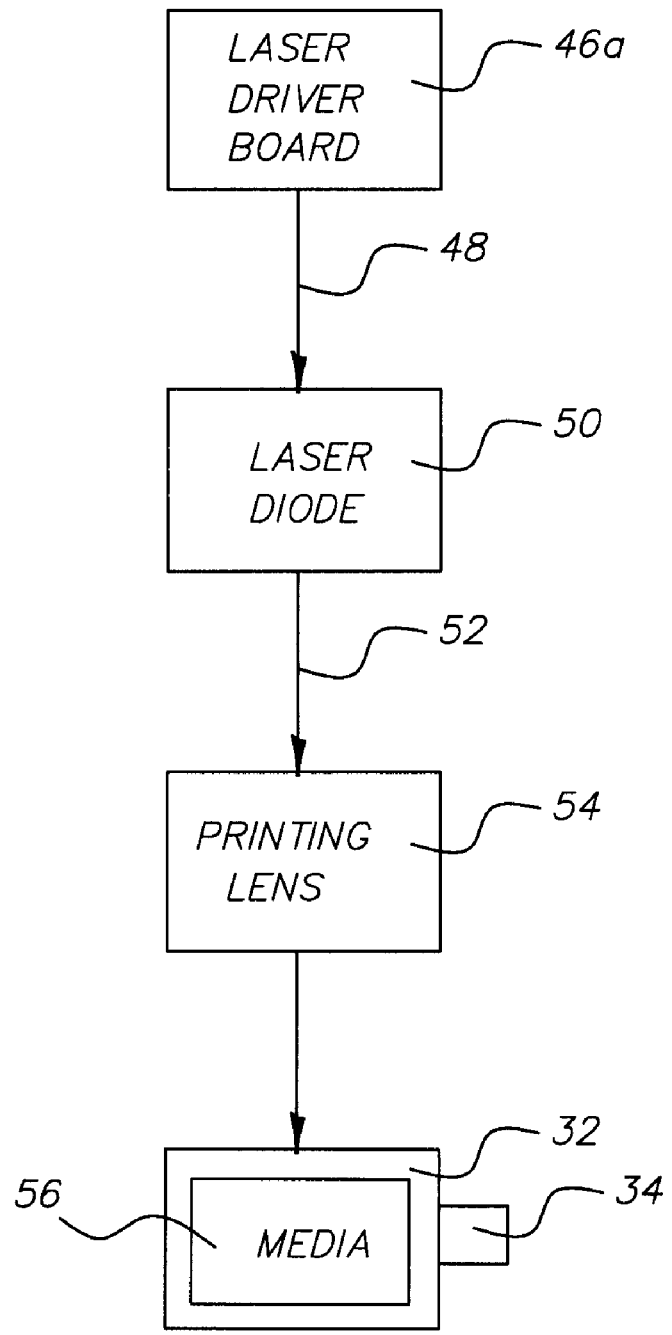
FIG. 3 is a block diagram showing the optical path of the apparatus of FIG. 1.

FIG. 3 shows that in a preferred embodiment, the laser driver board 46a modulates a current 48 for at least one laser diode 50, such as an SDL-23-S9897 diode from JDS Uniphase formerly Spectra Diode Labs of California, which couples to at least one fiber optic 52 to deliver optical energy to at least one printing lens 54 such as a Kodak Q54 lens manufactured by Elcan of Midland, Ontario, Canada focused on the drum 32. A usable drum in this embodiment is a Kodak Approval XP4 Drum manufactured by Gillette of Rochester, N.Y. Media 56 is disposed on the drum for receiving the printed image.

It is contemplated that all the circuits could be used for each channel. That is, for each channel, there would be a memory, a lookup table, a base duty cycle, a programmable gate array, and a trailing edge extension circuit. In an alternative embodiment it is contemplated that the programmable gate array can have more than one channel programmed into it.

In a preferred embodiment, the printer is a color printer which preferably images one color at a time. It is preferred to image using a four bit value for each color, such as a four bit value for cyan, a four bit value for black, a four bit value for yellow, and a four bit value for magenta.

In an alternative embodiment, the look up table usable in this apparatus can be programmed as a 1, 2 or 3 bit image by programming the unused bits into the look up table by replicating the exposures into the unused space in the lookup table.

The invention has been described in detail with particular reference to certain preferred embodiments thereof, but it will be understood that variations and modifications can be effected within the scope of the invention.

PARTS LIST

10 Multibit per pixel image
11 Computer
13 PCI bus
13 Memory
14a Memory
14b Printer data path
16 Lookup table
18 Programmable gate array
20 Base duty cycle
22 Modulated drive signal
24 Modulated exposure
26 Pixel
28 Printer
32 Drum
34 Encoder
36 Home signal
38 Pixel rate
40 Phase lock loop
41 High frequency pixel clock
42 Trailing edge extension circuit
44 TEE count
46a Laser driver board
46b Laser driver board
46c Laser driver board
46d Laser driver board
48 Current
50 Laser diode
52 Fiber optic
54 Printing lens
56 Media
100 Second high frequency clock

What is claimed is:

1. An apparatus for printing a multibit per pixel image from a halftone binary digital bitmap having pixels comprising:
  a) memory for receiving said multibit per pixel image;
  b) lookup table external to said memory disposed in a programmable gate array for converting said multibit per pixel image to a base duty cycle and wherein said base duty cycle is disposed in said programmable gate array and is adapted for creating a modulated drive signal from said base duty cycle to modulate an exposure for each pixel in said multibit per pixel image;
  c) a printer adapted for using said modulated exposure to print an image, having a dpi greater than 1400, further comprising a drum capable of spinning;
  d) an encoder disposed on said drum for providing a home signal and a pixel rate; and
  e) a phase lock loop in communication with said programmable gate array to modify said pixel rate to a multiple of said pixel rate forming a high frequency pixel clock which is $2^n$ times the pixel rate, wherein n is an integer.

2. The apparatus of claim 1, further comprising a trailing edge extension circuit programmed into said programmable gate array for extending the end of said modulated exposure by a trailing edge extension (TEE) count.

3. The apparatus of claim 2, wherein said TEE count is determined from said look-up table.

4. The apparatus of claim 1, wherein said printer further comprises at least one laser driver board which modulates a current for at least one laser diode which couples to at least one fiber optic to deliver optical energy to at least one printing lens focused on said drum.

5. The apparatus of claim 1, wherein said printer is a color printer.

* * * * *